(12) United States Patent
Bird (10) Patent No.: US 8,775,470 B2
(45) Date of Patent: *Jul. 8, 2014

(54) METHOD FOR IMPLEMENTING FINE-GRAINED ACCESS CONTROL USING ACCESS RESTRICTIONS

(75) Inventor: Paul Miller Bird, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/097,967

(22) Filed: Apr. 29, 2011

(65) Prior Publication Data

US 2011/0208780 A1    Aug. 25, 2011

Related U.S. Application Data

(63) Continuation of application No. 10/837,387, filed on Apr. 30, 2004, now Pat. No. 7,958,150.

(51) Int. Cl.
*G06F 7/00* (2006.01)
*G06F 17/30* (2006.01)

(52) U.S. Cl.
CPC .... *G06F 17/30448* (2013.01); *G06F 17/30457* (2013.01); *G06F 17/30979* (2013.01)
USPC ........................................................ 707/783

(58) Field of Classification Search
CPC .................... G06F 17/30448; G06F 17/30457; G06F 17/3079
See application file for complete search history.

(56) References Cited

U.S. PATENT DOCUMENTS

| | | | |
|---|---|---|---|
| 5,815,574 A | 9/1998 | Fortinsky | |
| 6,026,388 A | 2/2000 | Liddy et al. | |
| 6,085,191 A | 7/2000 | Fisher et al. | |
| 6,308,273 B1 | 10/2001 | Goertzel et al. | |
| 6,321,235 B1 | 11/2001 | Bird | |
| 6,321,334 B1 | 11/2001 | Jerger et al. | |
| 6,424,974 B1 | 7/2002 | Cotner et al. | |
| 6,487,552 B1 * | 11/2002 | Lei et al. | 1/1 |
| 6,643,633 B2 | 11/2003 | Chau et al. | |
| 6,721,727 B2 | 4/2004 | Chau et al. | |
| 7,133,875 B1 | 11/2006 | Chatterjee et al. | |
| 8,515,948 B2 * | 8/2013 | Chen et al. | 707/717 |
| 2003/0046550 A1 | 3/2003 | Carroll et al. | |
| 2004/0139043 A1 | 7/2004 | Lei et al. | |
| 2005/0246338 A1 | 11/2005 | Bird | |
| 2007/0033196 A1 | 2/2007 | Moore | |

OTHER PUBLICATIONS

Bohlen, Michael H. et al., "Temporal Statements Modifiers," ACM Transaction on Database Systems, vol. 25, No. 4, Dec. 2000, pp. 407-456.

(Continued)

*Primary Examiner* — Michael Hicks
(74) *Attorney, Agent, or Firm* — Sughrue Mion, PLLC (57) ABSTRACT

Disclosed is a data processing system-implemented method, a data processing system and an article of manufacture for controlling access to data stored on a database having relational objects for which access restrictions are defined for elements of the relational objects The data processing system-implemented method includes receiving a user request to access one or more relational objects of the database, identifying any access restrictions defined for the one or more relational objects, determining whether any identified access restrictions are applicable to the user request, determining whether any determined applicable access restrictions are to be enforced for the user request, and allowing access to the one or more relational objects based on the determined enforceable access restrictions.

4 Claims, 4 Drawing Sheets

(56) References Cited

OTHER PUBLICATIONS

Lakshmanan, Laks, V.S. et al., "SchemaSQL—An Extension to SQL for Multidatabase Interoperability," ACM Transactions on Database Systems, vol. 26, No. 4, Dec. 2001, pp. 476-519.

Ng, Wilfred, "An Extension of the Relational Data Model to Incorporate Ordered Domains," ACM Transactions on Database Systems, vol. 26, No. 3, Sep. 2001, pp. 344-383.

Hadjiefthymiades, SP et al., "A Generic Framework for the Deployment of Structured Databases on the World Wide Web," Computer Networks and ISDN Systems, May 1996, vol. 28, No. 7-11, pp. 1139-1148. (Abstract).

Zenchuan, Xu et al., "Dynamic Tuning of XML Storage Schema in VXMLR," 2003, Proceedings International Database Engineering and Applications Symposium, pp. 76-78. (Abstract).

Rakesh Agrawal, et al., "Extending Relational Database Systems to Automatically Enforce Privacy Policies", IBM Almaden Research Center, 650 Harry Road, San Jose, CA, Proceedings of the 21st International Conference on Data Engineering, IEEE, 2005.

Tzelepi, S. et al. "Security of Medical Multimedia", Medical Informatics and the Internet in Medicine, vol. 27, No. 3, Sep. 2002, pp. 169-184.

Damiani, E., et al. "Regulating Access to Semistructured Information on the Web", Information Security for Global Information Infrastructures, Sixteenth Annual Working Conf. on Information Security, Aug. 22-24, 2000 Bejing, China pp. 351-360.

Duesterwald, E., "A Practical data flow framework for array reference analysis and its use in optimizations" ACM Sigplan Noticies Vo. 28, No. 6, Jun. 1993, Proc of the ACM SIGPLAN '93 conf on Programming Language Design and Implementation Albuquerque, NM, Jun. 23-25, 1993, pp. 68-77.

Low, M. et al, "Fine Grained Object Protection in Unix" Operating Systems Review vol. 27, No. 1, Jan 1993, pp. 33-50.

Salemi, C., et al., "A Privilege Mechanism for UNIX System V Release 4 Operating Systems" Conf. Proceedings, USENIX, Summer 1992 Technical Conf, San Antonio Texas, Jun. 8-12, 1992, pp. 235-241.

Leiss, E. et al. "Protecting Statistical Databases by Combining Memoryless Table Restrictions with Randomization," AFIPS Conf. Proc. vol. 56 1987 National Computed Conference, Jun. 15-18, 1987, Chicago, Illinois, pp. 591-600.

Damiani, E., et al., "A Fine-Grained Access Control System for XML Documents" ACM Transactions on Information and System Security, vol. 5, No. 2 May 2002, pp. 169-202.

Grimm R et al., "Separating Access Control Policy, Enforcement, and Functionality in Extensible Systems," ACM Transactions on Computer Systems, vol. 19, No. 1, Feb. 2001, pp. 36-70.

Coulouris, G., et al. "Security Requirements for Cooperative Work: A Model and Its System Implications" Position paper for the $6^{th}$ SIGOPS European Workshop, Dagstuhl, Sep. 1994 pp. 184-186.

Wang, Weigang, "Team-and-Role Based Organizational Context and Access Control for Cooperative Hypermedia Environments," Hypertext 99, Darmstadt, Germany, Copyright ACM 1999, pp. 37-46.

Panagiotis Katsaros, "On the Design of Access Control to Prevent Sensitive Information Leakage in Distributed Object Systems: A Colored Petri Net Based Model", SpringerLink Contemporary, Oct. 11, 2005, vol. 3761. www.springerlink.com/content/5p71w09j9rlepaye/fulltext.pdf.

\* cited by examiner

METHOD FOR IMPLEMENTING FINE-GRAINED ACCESS CONTROL USING ACCESS RESTRICTIONS

CROSS-REFERENCE TO RELATED PATENT APPLICATION

This application is a Continuation of U.S. application Ser. No. 10/837,387, filed on Apr. 30, 2004, the entire disclosure of which is incorporated herein by reference.

FIELD OF THE INVENTION

The present invention relates to database management systems, and more particularly to a method, a system and a computer program product for fine-grained access control of data, stored in a database, using access restrictions.

BACKGROUND

Access control for data and information contained in databases is of increasing importance for reasons relating to security and privacy. In a database management system (DBMS), data is stored in data containers made up of records having one or more data fields. In a relational database management system, the data container is a relational object made up of rows and columns wherein each row represents a record and the columns are fields in those records. A relational object may be, for example, a relational table or relational view.

Fine-grained access control (FGAC) has grown in importance to commercial and government users of relational databases especially with recent government initiatives to increase overall security. FGAC is typically defined as the ability to control the access to data by any user at the object level and lower levels. For example, FGAC can be used to limit user access to a specific set of rows in a relational table. This level of access control is desirable for all areas of relational data access such as utilities, but is particularly desirable for data manipulation language (DML) SQL statements such as SELECT, INSERT, UPDATE and DELETE.

Traditional methods of implementing FGAC within relational databases have relied upon the use of views. A view is a logical table which is derived from existing tables and can be queried by users in the same manner as a regular table. A view is defined by metadata known as a view definition. The view definition contains mappings to one or more columns in one or more tables stored on a database. Typically, the view definition is provided a priori by the user of the database in the format of a CREATE VIEW SQL statement.

Views provide one method for implementing FGAC that works well when the number of different restrictions is few or the granularity of the restrictions is such that it affects large, easily identified groups of users. When these conditions are not true, a number of issues arise with the use of views including: (1) view definitions may become quite complex in an effort to contain all the restrictions in one view, straining system limits and making maintenance of the view difficult; (2) if a large number of simple views is desired, each one implementing a unique view of a table based on the restrictions for a specific set of users, the routing of user requests becomes difficult with the solution often being resolved within the database application instead of the DBMS; and (3) if a user can bypass the view when accessing data, for example by having direct access to the underlying tables for query access, then restrictions may be not enforced.

Another known implementation of FGAC uses context attributes of a user session to modify SQL statements by adding a predicate into the query. A predicate is a condition that must be satisfied for the DBMS to return a value. In this approach, the context attributes of a user session (e.g. user identifier) are compared against a security policy defined within a procedure provided by the user on a table or view to make decisions regarding access to data. This approach allows row restrictions traditionally handled by views to be dynamically added to queries without requiring application modification, however this approach has several disadvantages. Firstly, this approach requires user programming of a strictly defined "predicate producing" procedure in order to implement a security policy. The creation of user defined procedures for each policy is time consuming and error prone. Secondly, this approach does not provide access control at the column level. Thirdly, this approach interferes with dynamic SQL caching because the modified SQL statement will no longer match the original text from the request which makes statement matching problematic and thus, has an impact on the performance benefits of the caching. Cached SQL statements can not generally be shared because the result of the security policy applicable to cached statements (i.e. the predicate to be added to the query) is not known in advance.

Users of modern relational databases desire the following capabilities in an FGAC implementation:

(1) an implementation which solves the problem within the DBMS without application changes or application awareness of the implementation;

(2) a pervasive implementation that ensures that all users of the table being controlled are affected, regardless of how the table is accessed;

(3) an implementation that minimizes the complexity and maintenance of the fine-grained access control policies defined by the user;

(4) the ability to apply the implementation to both tables and views;

(5) the ability to control access to rows as well as columns as desired; and (6) the ability to have unlimited granularity control within the implementation.

In view of the shortcomings of known FGAC implementations, there exists a need for an improved method of implementing fine-grained access control to a database.

SUMMARY

The present invention obviates or mitigates the foregoing problems associated with the prior art by providing a method, a system and a computer program product for fine-grained access control of data, stored in a database, using access restrictions. In one example embodiment, access restrictions and exceptions thereto are used to provide fine-grained access control, specifically the ability to restrict both column and row access to relational objects, for example, a relational table or relational view.

In accordance with one aspect of the present invention, there is provided a data processing system-implemented method for directing a data processing system to control access to data stored on a database having relational objects for which access restrictions are defined for elements of the relational objects, the data processing system-implemented method including receiving a user request to access one or more relational objects of the database, identifying any access restrictions defined for the one or more relational objects, determining whether any identified access restrictions are applicable to the user request, determining whether any determined applicable access restrictions are to be enforced for the user request, and allowing access to the one or more relational objects based on the determined enforceable access restrictions.

In accordance with another aspect of the present invention, there is provided an article of manufacture for directing a data processing system to control access to data stored on a database having relational objects for which access restrictions are defined for elements of the relational objects, the article including a program usable medium embodying one or more executable data processing system instructions, the executable data processing system instructions including executable data processing system instructions for receiving a user request to access one or more relational objects of the database, executable data processing system instructions for identifying any access restrictions defined for the one or more relational objects, executable data processing system instructions for determining whether any identified access restrictions are applicable to the user request, executable data processing system instructions for determining whether any determined applicable access restrictions are to be enforced for the user request, and executable data processing system instructions for allowing access to the one or more relational objects based on the determined enforceable access restrictions.

In accordance with a further aspect of the present invention, there is provided a data processing system for controlling access to data stored on a database having relational objects for which access restrictions are defined for elements of the relational objects, the data processing system including a module for receiving a user request to access a relational object, a database catalog defining access restrictions for restricting user access to the database, wherein each access restriction identifies a row or column in a relational object to which the access restriction applies, a type of access which is restricted, and information concerning one or more users to which the access restriction applies, a restriction evaluation module including a component for identifying any access restrictions defined for the one or more relational objects, a component for determining whether any identified access restrictions are applicable to the user request, and a component for determining whether any determined applicable access restrictions are to be enforced for the user request, and a module for allowing access to the one or more relational objects based on the determined enforceable access restrictions.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings which show, by way of example, embodiments of the present invention, and in which.

Similar references are used in different figures to denote similar components.

DETAILED DESCRIPTION OF THE EMBODIMENTS

The following detailed description of the embodiments of the present invention does not limit the implementation of the embodiments to any particular computer programming language. The computer program product may be implemented in any computer programming language provided that the OS (Operating System) provides the facilities that may support the requirements of the computer program product. A preferred embodiment is implemented in the C or C++ computer programming language (or may be implemented in other computer programming languages in conjunction with C/C++). Any limitations presented would be a result of a particular type of operating system, computer programming language, or data processing system and would not be a limitation of the embodiments described herein.

Figure 1:
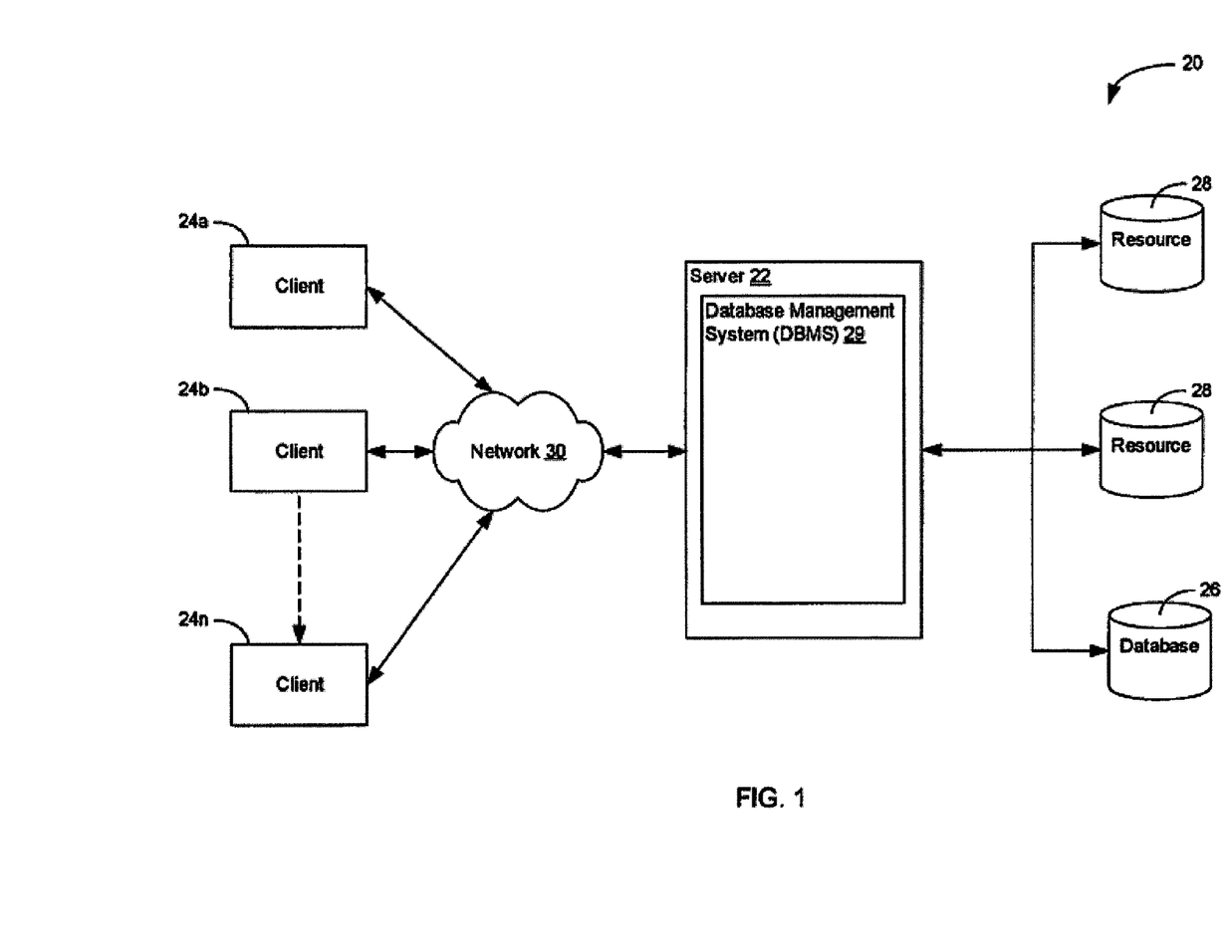
FIG. 1 is a schematic diagram of a computer system suitable for practicing the present invention.

Reference is first made to FIG. 1, which shows a computer system 20 including a server 22 and clients 24 indicated individually by references 24a, 24b, . . . 24n, interconnected by a network 30. The server 22 may be modeled as a number of server components including a database server or database management system 29, for example, a relational database management system such as the DB2™ product from IBM™ (International Business Machines) Corporation. The clients 24 may be computers, data processing systems, workstations, handheld portable information devices, or computer networks. The clients 24 may be the same or different. In one embodiment, the network 30 is the Internet or World Wide Web (WWW).

The computer system 20 further includes a database 26 and resources 28 connected to the network 30. The resources 28 may be storage media, databases, a set of XML (eXtensible Markup Language) documents, a directory service such as a LDAP (Lightweight Directory Access Protocol) server, and backend systems. In some embodiments, data may be stored across multiple databases. The interface between the server 22 and the database 26 and resources 28 may be a local area network, Internet, or a proprietary interface, or combinations of the foregoing. The database 26 and resources 28 may be accessed by the server 22 and the clients 24. Any of the server 22, the clients 24, the database 26 and the resources 28 may be located remotely from one another or may share a location. The configuration of the computer system 20 is not intended as a limitation of the present invention, as will be understood by those of ordinary skill in the art from a review of the following detailed description. For example, in other embodiments the network 30 may comprise a wireless link, a telephone communication, radio communication, or computer network (e.g. a Local Area Network (LAN) or a Wide Area Network (WAN)).

Figure 2:
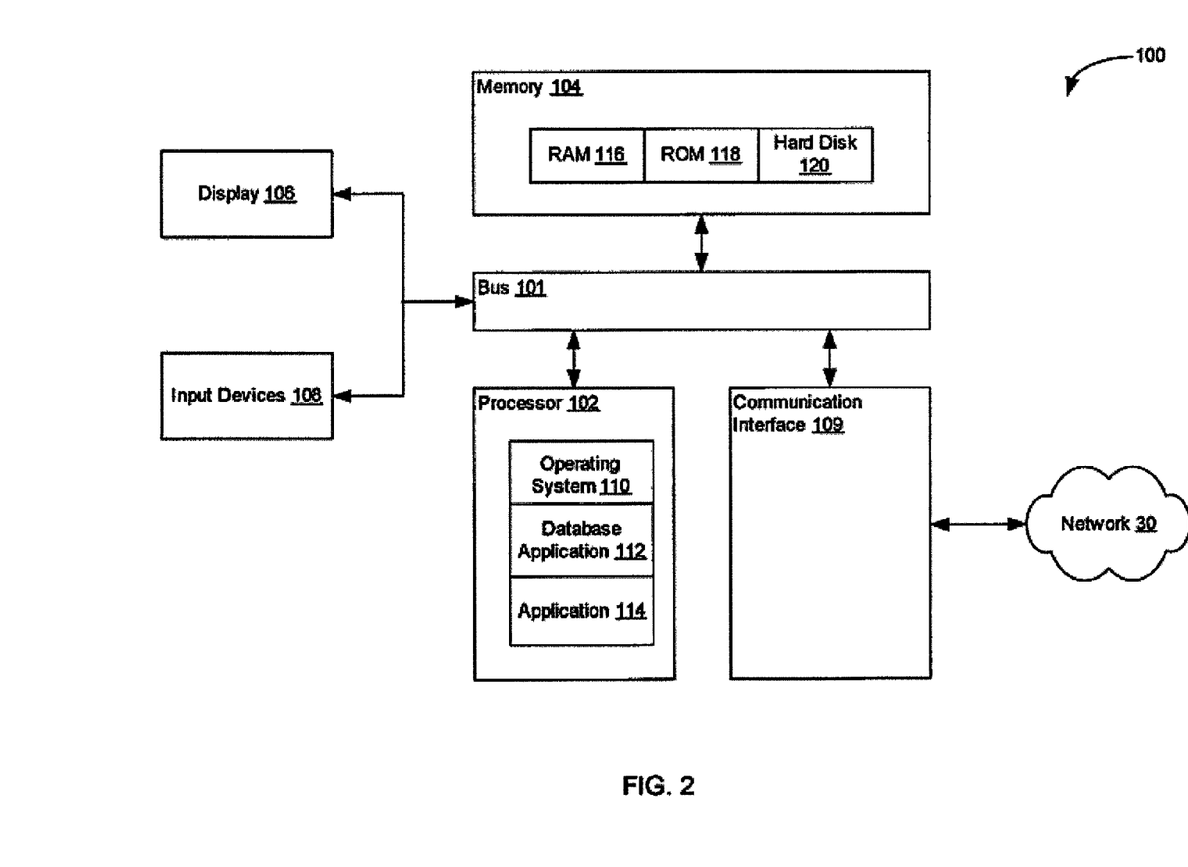
FIG. 2 is a block diagram of a data processing for the computer system of FIG. 1.

Reference is now made to FIG. 2, which shows a data processing system 100 in the computer system 20. The data processing system 100 comprises a bus 101 coupled to a processor 102, memory 104, display 106, and user input devices 108 such as a keyboard and a pointing device (e.g. mouse), and a communication interface 109 for communicating with the network 30. An operating system 110, database application 112, and other application programs 114 run on the processor 102. The memory 104 includes random access memory ("RAM") 116, read only memory ("ROM") 118, and a hard disk 120. The data processing system 100 may be a client 24 or a server 22.

Figure 3:
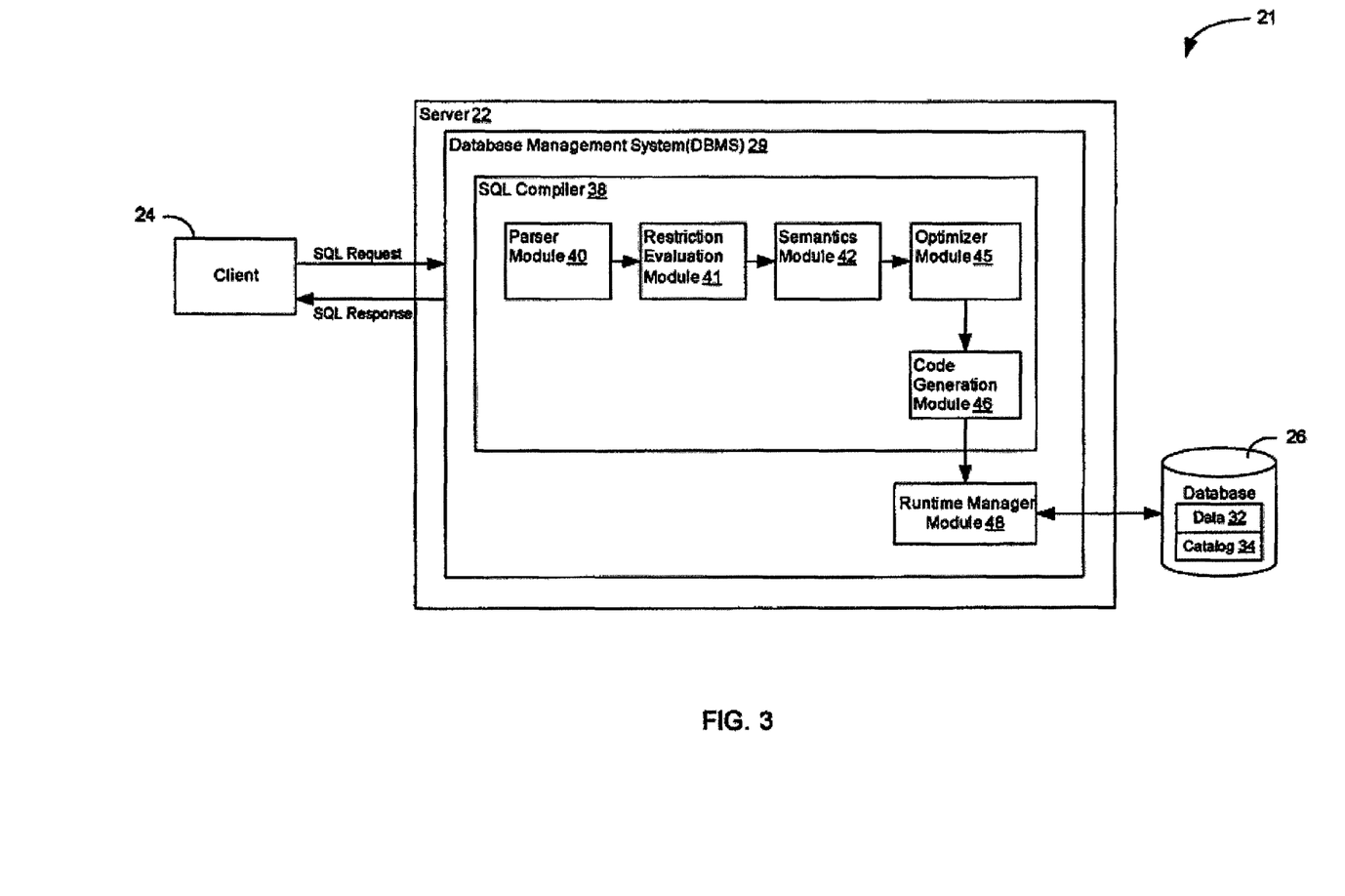
FIG. 3 is a schematic diagram of an information retrieval system constructed according to the present invention.

Referring now to FIG. 3, one embodiment of an information retrieval system 21 constructed according to the present invention will be described. In this embodiment, the information retrieval system 21 comprises a server 22, clients 24 coupled to the server 22 via a network, and a database 26. The server 22 includes a database management system (DBMS) 29, for example a relational database management system such as the DB2™ product from IBM™. The DBMS 29 includes an SQL compiler 38 comprising a parser module 40, a restriction evaluation module 41, a semantics module 42, an optimizer 45, and a code generation module 46. In some embodiments, the SQL compiler 38 also contains a query language rewrite module which manipulates the internal representation of an SQL statement to an equivalent but more efficient form. The SQL compiler 38 is coupled to a runtime manager module which executes the output of the SQL compiler 38. The DBMS 29 is coupled to the database 26. The database 26 includes data 32 and a catalog 34. The catalog 34 includes dictionary functions and stores various schemas, mappings and other detailed information regarding the DBMS 29.

The parser module 40 receives SQL statements (queries) from clients 24 and information regarding the compilation environment (e.g. default schema name for any unqualified table reference(s)). When an SQL statement is received by the parser module 40, it converts the SQL statement into an internal compiler representation. The restriction evaluation module 41 evaluates any restrictions associated with the table(s) or view(s) referenced by the SQL statement. It then takes the relevant evaluated access restrictions to construct a dynamic pseudo-view representation of all of the restrictions. A pseudo-view is a view-like entity that includes the aggregate of the applicable column restrictions for the query in the select list, for example SELECT COL1, COL3 FROM T1, with all applicable row restrictions added to the definition via the WHERE clause in the form of joined (ANDed) predicates. The pseudo-view has the same or similar attributes as a predefined regular view, however it is dynamically created so does not exist in the catalog 34 and has no dependencies. The pseudo-view is not recognized for dependency recording or authorization purposes by the DBMS 29, however in other respects it would be handled by the SQL compiler 38 as a regular view definition. The pseudo-view definition text is translated to the internal representation format by the restriction evaluation module 41. These pseudo-view constructs are injected into the SQL statement representation immediately before the target object on which the restrictions are defined. The modified representation is then passed to the subsequent SQL compiler processing logic for normal processing. This means that normal query rewrite and optimization operations performed by the SQL Compiler 38 are not affected.

In some embodiments, views are stored by the SQL Compiler 38 as statement text and must be re-parsed by the semantics module 42 before injecting them into the internal representation. In other embodiments, views are stored in their internal representation and there is no need to re-parse the view definition text before adding them to the internal representation. The method by which normal view support is implemented determines whether the restriction evaluation module 41 has to produce an internal representation or can just provide the pseudo-view definition text.

Access restrictions that can be used to control access to the database 26 will be now explained. Access restrictions are defined in the database 26 for an object such as a table or view, for example a table T1 stored in the database 26. It will be apparent to those skilled in the art that the concept of an access restriction can also be applied to any object upon which a user could also define a normal view within an RDBMS. Typically, the access restrictions are stored in the catalog 34. Access restrictions defined within the database 26 on a specific table or view at either row or column level. Each restriction identifies the specific table or view which it affects, the specific actions which are affected by it, the level of restriction (either row or column), and the specific entities affected by the restriction (e.g. by authorization ID). For each access restriction, separate catalog entries are created. The aggregate of the applicable access restrictions for a particular table or view referenced by an SQL statement determines the data which can be accessed. Each subsequent restriction further restricts what is already restricted. It does not override what is already restricted.

Once access restrictions are defined on a table or view, any SQL statement that attempts to access that table or view will have the restrictions imposed on that access. Any changes to the access restrictions will result in the appropriate invalidations occurring to any static or cached dynamic SQL statements based on the appropriate information (for example restriction name, for DROP, or table name and type of access that the restriction affects, for CREATE). Exceptions to access restrictions may also be defined, for example, to allow a user or list of users with specific authorization ID(s) to bypass a specific access restriction. Exceptions are defined within the database 26 on a specific access restriction Exceptions are stored in the catalog 34 and in addition to specifying the access restriction to which they apply, they also identify the entities to which the exception applies (i.e. which entities can bypass the specified access restriction).

Figure 4:
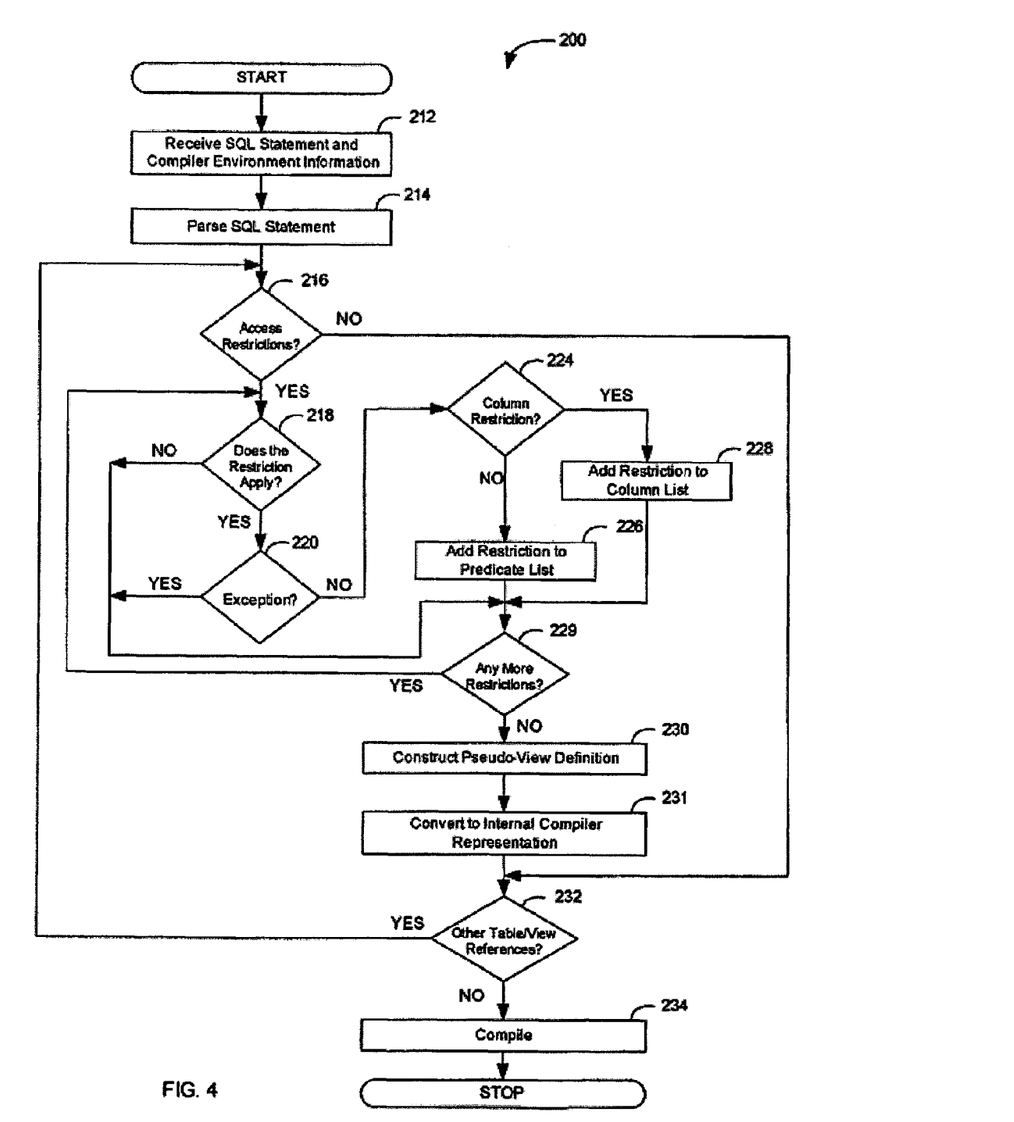
FIG. 4 is a flowchart of a procedure for implementing access restrictions to control access to a database.

Referring now to FIG. 4, a procedure 200 for implementing access restrictions to control access to the database 26 will be explained. In the first step 212, when a user of the DBMS 29 attempts to access a table or view using an SQL statement (e.g. INSERT, UPDATE, DELETE, MERGE, SELECT), the SQL compiler receives the SQL statement and relevant compilation environment information (e.g. default schema name for use with any unqualified table reference(s)). Next, the parser module 40 breaks the SQL statement into components for compiling and converts them into an internal compiler representation (step 214). For each reference to a table or view in the SQL statement, the restriction evaluation module 41 determines if any access restrictions have been defined (decision block 216).

If no access restriction is defined, then the next reference is evaluated (decision block 232). If an access restriction is defined, the restriction evaluation module 41 then determines whether the restriction applies to the present SQL statement (decision block step 218). This decision is based upon a comparison between the restriction definition and the statement information with respect to the type of access being attempted and the entity (e.g. authorization ID) attempting the access. The access restriction applies to the SQL statement if the identified restriction matches the statements information.

If the restriction does not apply, then the next restriction is evaluated (decision block 229). If the restriction does apply, the restriction evaluation module then determines if an applicable exception has been defined for the present SQL statement (decision block 220). Exceptions to the access restrictions allow the restrictions applicable to the particular table or view being referenced by the statement to be bypassed. However, access restrictions other than those specified by the exception(s) must still be obeyed by the SQL compiler 38. The use of exceptions allows global restrictions with limited exceptions to be easily defined upon a table or view (e.g. no one can read any data from this table except the person(s) granted the exception).

If an exception does apply, then the access restriction does not apply to the SQL statement and the next restriction is evaluated (decision block 229). If an exception does not apply, then the access restriction applies to the SQL statement and must be enforced. Next, the restriction evaluation module 41 determines whether the restriction is a row or column restriction (decision block 224). If the restriction is a column restriction, the access restriction is added to a column list (step 228). If the restriction is a row restriction, then the access restriction is added to a predicate list (step 232).

Once all access restrictions for a specific table or view reference have been evaluated, the restriction evaluation module 41 then constructs a dynamic pseudo-view definition using the column list and predicate list (step 230). A pseudo-view definition may be of the following form:

SELECT <column list> from <object name> where <predicate list> where <column list> is the aggregate of the column restrictions, <object name> is the table or view referenced, and <predicate list> is the aggregate of the row restrictions ANDed together.

Next, the restriction evaluation module 41 translates the dynamic pseudo-view definition into the internal format used by the SQL Compiler 38 and injects the result directly in front of the data object referenced in the original internal statement representation (step 231). If there are other references to a table or view, steps 216 to 231 are repeated for each such reference (decision block 232). Once all data object references have been evaluated for access restrictions and the resultant pseudo-view definitions, if any, injected into the internal statement representation, then normal SQL compiler processing continues (i.e. any query rewrite, semantics, optimization, and code generation modules are called) until it ends with the production of a section (step 234). A section is a complied form of the SQL statement which is executable by the DBMS 29. A section contains the executable form of the optimized access plan for executing the SQL statement.

A partial pseudo-code implementation of an example embodiment of the present invention for a relational database management system (rDBMS) such as the DB2™ product from IBM™ will now be described.

Access restrictions are created using a CREATE RESTRICTION function defined in the catalog 34. A CREATE RESTRICTION statement creates either a column or row restriction on a table or view.

A CREATE RESTRICTION statement may be defined as follows:

CREATE RESTRICTION <restriction name>
 TO COLUMNS (<column name>)/*where the restriction is column restriction*/
   ROWS WHERE (<search condition>)/*where the restriction is row restriction*/
 RESTRICTING <access restricted>
 ON <table name>/*where restriction imposed on a table*/
 FOR <authorization name>
 EXCEPT <authorization name>/*where exception defined*/
/*where
<restriction name> is the name of the restriction being created. The restriction name must not be the same as a restriction name that already exists. The user may specify only one type of restriction at a time (row or column);

<column name> is the name of the column(s) to be restricted (if the restriction is a column restriction). The restriction will restrict the columns that can be accessed to those specified in the column list. Each column name must be an unqualified name that identifies a column of the table identified in the ON clause;

<search condition> is the condition that must be satisfied (if the restriction is a row restriction). Sometimes referred to as the predicate list. The restriction will restrict the rows that are accessible to the ones that satisfy the search condition;

<access restricted> is the types of access that are to be restricted for the columns specified in the column list (for column restrictions) or the rows specified by the search condition (for row restrictions). For column restrictions, the access that may be restricted are:
  ALL ACCESS—All access that can be restricted are restricted. This is equivalent to SELECT, UPDATE.
  SELECT—The SELECT access is restricted.
  UPDATE—The UPDATE access is restricted.
For row restrictions, the access that may be restricted are:
  ALL ACCESS—All access that can be restricted are restricted. This is equivalent to DELETE, INSERT, SELECT, UPDATE.
  DELETE—The DELETE access is restricted.
  INSERT—The INSERT access is restricted.
  SELECT—The SELECT access is restricted.
  UPDATE—The UPDATE access is restricted.

<table name> identifies the table or view for which the restriction applies. The table name must identify a table or view that currently exists but must not identify a declared temporary table;

FOR <authorization name> indicates to whom the restriction applies. The authorization name lists one or more authorization IDs, and may include a group ID that indicates a group or set of users to whom the restriction applies such as PUBLIC;

EXCEPT <authorization name> identifies an exception to the restriction. The restriction will not apply for each of the authorization IDs listed. This is typically used when a group ID is used in the FOR clause. */

Examples 1 and 2 illustrate the operation of CREATE RESTRICTION statements.

EXAMPLE 1

CREATE RESTRICTION OWN_SALES
TO ROWS WHERE (SALES_PERSON=USER)
RESTRICTING ALL ACCESS
ON SALES
FOR LUCCHESSI, LEE, GOUNOT

This statement would create a row restriction on the SALES table that would allow sales persons to see only their own information.

EXAMPLE 2

CREATE RESTRICTION PROTECT_SALARY
TO COLUMNS (ID, NAME, DEPT, JOB, YEARS)
RESTRICTING ALL ACCESS
ON STAFF
FOR PUBLIC
EXCEPT PULASKI

This statement would create a column restriction on the STAFF table that would allow only the manager of the administration department, i.e. Pulaski, to see the salary and commission columns (given a table containing the following columns ID, NAME,DEPT,JOB,YEARS, SALARY, COMMISSION).

Access restrictions can be altered using an ALTER RESTRICTION function which would modify the contents of the catalogs 34. An ALTER RESTRICTION statement alters the restrictions and exceptions thereto for a column or row restriction on a table or view.

An ALTER RESTRICTION statement may be defined as follows
   ALTER RESTRICTION <restriction name>
      ADD FOR <authorization name>
      DROP FOR <authorization name>
      ADD EXCEPTION FOR <authorization name>
      DROP EXCEPTION FOR <authorization name>
/*where
<restriction name> is the name of the restriction to be altered. The restriction name must be the same as a restriction name that already exists;
ADD FOR <authorization name> adds the restriction for the specified authorization IDs. The authorization name lists one or more authorization IDs.
DROP FOR <authorization name> drops the restriction for the specified authorization IDs. The authorization name lists one or more authorization IDs.
ADD EXCEPTION FOR <authorization name> adds an exception to the restriction. The authorization name lists one or more authorization IDs. The restriction no longer applies for the specified authorization IDs.
DROP EXCEPTION FOR <authorization name> drops the exception to the restriction. The authorization name lists one or more authorization IDs. The restriction becomes applicable for the specified authorization IDs.

Examples 3 and 4 illustrate the operation of ALTER RESTRICTION statements.

EXAMPLE 3

ALTER RESTRICTION OWN_SALES
DROP FOR LEE
This statement drops the restriction for LEE on the SALES table, for example because LEE has become the director of sales.

EXAMPLE 4

ALTER RESTRICTION PROTECT_SALARY
ADD EXCEPTION FOR HAAS
This statement adds an exception for restriction PROTECT_SALARY allowing the president HAAS to see the salary and commission columns.

In the foregoing implementation, the following conditions would apply: restriction name is a user-supplied name up to 128 bytes; authorization name is any valid form of authorization name such as one or more group names, user name, roles, or PUBLIC; column name is a list of one or more columns defined for the table or view; and search condition is a self-contained predicate list (e.g. WHERE clauses joined (ANDed) together).

Access restriction creation and alteration will now be further explained by way of examples 5 to 7 using a table t1. The table t1 is defined as follows:
CREATE TABLE t1 (col1 INTEGER, col2 CHAR(8), col3 INTEGER)

EXAMPLE 5

CREATE RESTRICTION r1
TO COLUMNS (col1)
RESTRICTING ALL ACCESS ON t1
FOR PUBLIC
This restriction would allow all users in the group PUBLIC to access only col1 for any access attempted.

EXAMPLE 6

In this example, the restriction r2 is added. Restrictions r1 and r2 are both applicable. The restriction r2 is defined as follows:
CREATE RESTRICTION r2
TO COLUMNS (col2, col3)
RESTRICTING SELECT
ON t1
FOR GROUP ACCT, USER BOB
This restriction would restrict members of the ACCT group and the user BOB to columns col2 and col3 when accessing table t1. They would not be able to update these columns. The user BOB would be able to now select columns col1, col2, and col3 as a result of the two restrictions defined so far as would members of the ACCT group.

EXAMPLE 7

In this example, the restriction r3 is added. Restrictions r1, r2 and r3 are all applicable. The restriction r3 is defined as follows:
CREATE RESTRICTION r3
TO ROWS WHERE (col2=USER)
RESTRICTING ALL PRIVILEGES
ON t1
FOR PUBLIC
This restriction would ensure that every access to the table t1 would now be implicitly qualified by the search condition (predicate) col2=user. If user BOB issues the SQL statement SELECT*FROM t1, he would see col1, col2, and col3 for those rows where col1 equaled his authorization ID. If user FRED issued the same SQL statement and was not a member of the ACCT group, he would see only col1 for those rows where col1 equaled his authorization ID.

If Fred were to be given access to all rows, the following exception would be defined:
ALTER RESTRICTION r3
ADD EXCEPTION FOR FRED
If user FRED now issued the same SQL statement, he would see only col1 but for all available rows.

Several different approaches for reuse or partial reuse of cached dynamic SQL statements having access restrictions may be used. According to one embodiment, partial reuse of cached dynamic SQL statements is provided by direct matching of relevant cached SQL statement information to determine that the exact same authorization information is in use as were in use for the cached query when it was compiled. An exemplary method of implementing partial reuse of cached dynamic SQL statements will now be described.

When an SQL statement is compiled, a dependency is added to the information gathered for that statement's compilation for every applicable restriction whether it is implemented or bypassed due to an exception. The dependency is added based on the restriction name and allows for specific invalidation of the final compiled SQL statement if the restriction is dropped or an exception to the restriction is added or dropped.

If a restriction or exception for a restriction for a specific user exists on any table or view referenced in the SQL statement, regardless of whether it is actually implemented into the section being compiled, then the specific user authorization ID that requested the compilation should be stored as part of the compilation environment used by the dynamic SQL caching logic to match user SQL queries. This value should be used to ensure that any future use of that cached SQL statement uses the same authorization ID; this would be enforced as part of the request matching logic implemented by the dynamic SQL cache mechanism. If the last user based restriction (of either row or column type) for a table is dropped, then all cached entries indicating that they were evaluated while user restrictions were in place should be invalidated. If the first user based restriction (of either type) for a table is added, then all cached entries indicating that they were evaluated while user restrictions were not in place should be invalidated.

If a restriction or exception for a restriction for a group exists on any table referenced in the SQL statement, regardless of whether it is actually implemented into the section being compiled, then the specific list of groups for the compiling user authorization ID should be stored as part of the compilation environment used by the dynamic SQL caching logic to match user SQL queries. This list should be used to ensure that any future use of that specific cached entry has the same list of group IDs. The entire list should be stored, as the section was evaluated on the whole group list, not just specific entries. A future user cannot assume that there is no restriction affecting them because they do not have the same group ID in their list for which the restriction was in place for the existing cached entry. If the last group based restriction (of either type) for a table is dropped, then all cached entries indicating that they were evaluated while group restrictions were in place should be invalidated. If the first group based restriction (of either type) for a table is added, then all cached entries indicating that they were evaluated while group restrictions were not in place should be invalidated.

If any additional or different authorization classifications are used, such as roles, then similar matching logic should be used.

The foregoing approach will not allow any incorrect reuse of cached dynamic SQL statements ensuring that access restrictions are enforced on all access attempts. However, it also prevents potential reuse of previously compiled SQL statements, referred to as cached SQL statements, when the relevant authorization information does not match exactly between the new request and the cached entry. Another possible approach to this problem of sharing cached SQL statements is to ensure that the list of restrictions that should be enforced are the same for the new user compared to the cached information.

According to another embodiment, cached dynamic SQL statements are reused by comparing restrictions that were implemented in a cached SQL statement and restrictions that apply to a new SQL query. The method includes the steps of storing access restrictions that are applied to cached SQL statements, determining which restrictions apply for the present SQL request, comparing the restrictions of the cached statement and the present SQL request, and if they match, the cached SQL statement can be reused. An exemplary implementing of this method will now be described.

When a SQL statement is compiled, a list of restriction names (A) that affect the resulting section is obtained. This list is independent of the dependency information. All restrictions for a table or view available are defined in a restriction packed descriptor (B) which can be cached for runtime performance reasons, for example in a catalog cache. When a request for the same SQL statement which matches the compilation environment of the cached dynamic SQL statement is received, the user authorization information associated with the new request is evaluated in the context of the set of cached restriction packed descriptors (there may be more than one object accessed by the cached entry) which have been identified as relevant by the cached entry to produce a list of applicable restrictions (C) and this list (C) is compared with the section list (A). If identical, the section can be used by the new user.

The above approach provides accurate reuse of cached dynamic SQL statements and may be performed at different times and intervals. When performed less often, for example only when first using a section or when restrictions change, any extra performance cost associated with comparing restrictions may be mortgaged over time resulting in minimal impact on system performance. Given the high overhead of compiling, the minimal impact created by evaluation of past and present access restrictions applicable to SQL queries has performance advantages if the possibility of sharing cached SQL statements exists.

For static SQL, the user authorization ID in use during the bind of the package is what is used in any applicable restriction. Dynamic SQL must be used to have the authorization ID of the person executing the package used in any applicable restriction.

When rerouting to a materialized query table (MQT), any applicable restriction on the base table will also apply to the data obtained from the MQT. If a restriction causes the ability to reroute to an MQT to fail, the query will simply access the base table for the result of the query.

The present invention provides a declarative process for easy creation and modification of access restrictions. Written procedures for defining access controls are not required. Further, access control is possible at the row and column level, and at least partial reuse of cached dynamic SQL statements is provided. The present invention may be used in most circumstances where a table or view may be applied, including most types of SQL statements. It can also be extended to apply to other data storage objects that act as access control points such as table nicknames used in federated systems.

Advantages of the present invention in its various embodiments include: there is no need for database application awareness of the restrictions and no application change is required; all users of the object (e.g. table or view) having restrictions defined thereon are affected by the restrictions regardless of how they access the object; all restrictions are defined and controlled from a central catalog definition and can be maintained on an individual basis; a restriction need only be defined once although it will affect many different sets of users; restrictions can be defined on any type of table or view; restrictions can be defined as affecting users at any granularity level, such as public, groups, roles, or individuals, or any combination of these; and exceptions to defined restrictions allows identified users to bypass specified restrictions.

Several variations of the present invention are known. For example, the authorization to access data in a table or view can be based on a number of factors including user authorization ID, group ID, department, role or another type of designation desired. In some embodiments, the restriction evaluation module 41 is included in the run time manager module 48 rather than the SQL compiler 38. In such cases, restriction evaluation would be incorporated into the section to produce a section "neutral" to the user authorization ID used to produce it but sensitive to the user authorization ID used to execute it. Restriction evaluation would be performed at runtime by the run time manager module 48. Runtime restriction evaluation reduces any impact on dynamic SQL caching caused by using access restrictions but increases the execution time of the runtime portion. In yet other embodiments, access restrictions are used to identify a row or column in table or view, the actions which are restricted, and the users that cannot access that row or column rather than the individuals or groups that can access that data. In these embodiments, access control may be implemented using negative logic in the pseudo-view definition and/or conjunctive logic. In such cases, the complexity and ability of access restrictions is expanded by modifying how the pseudo-view definition is created. Access restrictions may also be used to deny access to a row indirectly by introducing a false predicate for the restriction (i.e. the restriction definition itself means that no row will qualify). For example, if a row restriction of "1=0" were applied to PUBLIC no user would get any rows back from the relevant table. Exceptions to the row restriction could then be created to allow selected users to access the rows.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A data processing method for controlling access to data stored on a database, the method comprising:
   receiving and parsing a user request containing a reference to a relational object;
   determining column and row access restrictions based on the user's identity and the parsed request;
   constructing a pseudo-view of the relational object based on the determined column and row access restrictions;
   replacing the reference to the relational object in the request with the pseudo-view comprising the column and row restrictions, to create a modified user request, and
   compiling the modified request,
   wherein the pseudo-view representation is dynamically created by compiling and evaluating access restrictions defined for the said one or more relational objects; and wherein the modified user request is compiled after replacing the reference in the request to the one or more relational objects with the pseudo-view,
   wherein constructing the pseudo-view of the relational object comprises generating a SELECT statement of the form:
   SELECT <column list>from <object name>where <predicate list>,
   wherein <column list>is an aggregate of the column restrictions, <object name>is the referenced relational object, and <predicate list>is an aggregate of the row restrictions combined together,
   wherein the modified user request is compiled after replacing the reference in the request with the pseudo view, and
   wherein, when the user request has the form:
   SELECT <column list>from <object name>where <row or column>=<search condition>, the modified user request has the form:
   SELECT <column list>from (SELECT <column list>from <object name>where <predicate list>) where <row or column>=<search condition>.

2. The data processing method of claim 1, wherein the request is an SQL statement.

3. The data processing method of claim 1, wherein said dynamically creating the pseudo-view representation comprises translating the dynamic pseudo-view representation into an internal format used by an SQL compiler and replacing the relational object referenced in the user request with the translated dynamic pseudo-view representation thereby forming the modified user request.

4. The data processing method of claim 1, wherein SQL dependencies are added by the SQL compiler to information gathered for the compiling of the request for every applicable restriction, and the dependencies are added based on a name of the restriction, and invalidates the compiled statement when the restrictions are dropped.

* * * * *